United States Patent
Kintscher

(10) Patent No.: US 10,400,063 B2
(45) Date of Patent: Sep. 3, 2019

(54) CHAIN-TERMINATED POLYMERIC COMPOSITION, USE THEREOF AND METHOD FOR ITS PREPARATION

(71) Applicant: SILGAN HOLDINGS INC., Stamford, CT (US)

(72) Inventor: Juergen Kintscher, Hannover (DE)

(73) Assignee: Silgan Holdings Inc., Stamford, CT (US)

( * ) Notice: Subject to any disclaimer, the term of this patent is extended or adjusted under 35 U.S.C. 154(b) by 0 days.

(21) Appl. No.: 16/027,886

(22) Filed: Jul. 5, 2018

(65) Prior Publication Data
US 2018/0312628 A1 Nov. 1, 2018

Related U.S. Application Data

(63) Continuation of application No. 14/910,797, filed as application No. PCT/IB2014/059160 on Feb. 21, 2014, now Pat. No. 10,023,688.

(30) Foreign Application Priority Data

| Aug. 9, 2013 | (EP) | ................................ 13179915 |
| Sep. 13, 2013 | (EP) | ................................ 13184406 |
| Oct. 2, 2013 | (EP) | ................................ 13187147 |

(51) Int. Cl.
| C08G 63/668 | (2006.01) |
| C08G 63/12 | (2006.01) |
| C08L 67/00 | (2006.01) |
| C08G 63/78 | (2006.01) |
| C08L 27/06 | (2006.01) |

(52) U.S. Cl.
CPC ........... *C08G 63/668* (2013.01); *C08G 63/12* (2013.01); *C08G 63/78* (2013.01); *C08L 27/06* (2013.01); *C08L 67/00* (2013.01); *C08L 2201/08* (2013.01)

(58) Field of Classification Search
CPC .................................................. C08G 63/668
See application file for complete search history.

(56) References Cited

U.S. PATENT DOCUMENTS

| 10,023,688 B2* | 7/2018 | Kintscher | ............... C08L 67/00 |
| 2009/0215629 A1* | 8/2009 | Bevinakatti | ............ A01N 25/30 |
| | | | 504/358 |
| 2011/0201532 A1* | 8/2011 | Ponder | ................... C11D 3/001 |
| | | | 510/220 |

* cited by examiner

*Primary Examiner* — Michael F Pepitone
(74) *Attorney, Agent, or Firm* — Duane Morris LLP

(57) ABSTRACT

The invention concerns a novel chain-terminated polymeric composition, comprising hydroxyl-terminated polyesters and a method for preparing the composition and the use of the chain-terminated polymeric composition as a plasticizer. They play a predominant role in the field of metal vacuum closures (Twist-Off and Press-On-Twist-Off closures). Selection criteria regarding the suitability of plasticizers in food contact applications are properties such as low plasticizer volatility, low plastisol viscosity, PVC compatibility, softness and resilience of the gasket as well as non-toxicity and high plasticizer migration resistance. The invention concerns the chemical equation of FIG. 1 for obtaining the suggested chain-terminated polymeric composition, wherein x, y, and z are the stoichiometric ratios of dibasic carboxylic acid (DCA), glycerol or polyglycerol (GPG), and monobasic carboxylic acid (MCA), k is the number of methylene groups in the dibasic carboxylic acid, (k+2) is the number of carbon atoms therein, m is the degree of polymerization of polyglycerol used, (m+2) describes the hydroxyl functionality thereof, l is the number of methylene groups in the monobasic carboxylic acid, (l+2) is the number of carbon atoms in the monobasic carboxylic acid, and n is the degree of polymerization of the polyester formed by glycerol or polyglycerol and the dibasic carboxylic acid.

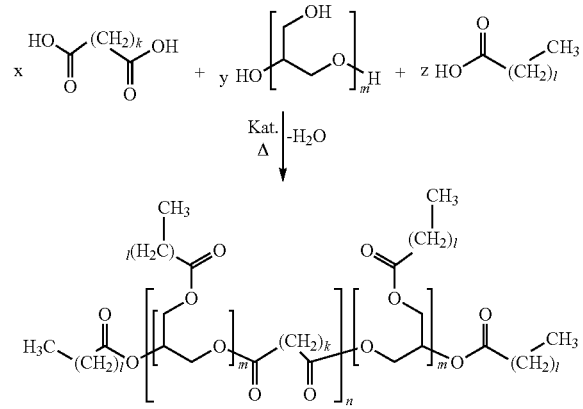

13 Claims, No Drawings

CHAIN-TERMINATED POLYMERIC COMPOSITION, USE THEREOF AND METHOD FOR ITS PREPARATION

The present application is a Continuation of U.S. patent application Ser. No. 14/910,797, now U.S. Pat. No. 10,023,688, which claims priority to United States national stage application under 35 U.S.C. § 371 of international patent application number PCT/IB2014/059160, filed on Feb. 21, 2014, which claims priority to European patent application number 13179915.7, filed on Aug. 9, 2013, European patent application number 13184406.0, filed on Sep. 13, 2013, and European patent application number 13187147.7, filed on Oct. 2, 2013, the entireties of which are incorporated herein by reference.

The invention is directed to a novel chain-terminated polymeric composition, comprising hydroxyl-terminated polyesters and a method for preparing the composition. The invention is also directed to the use (application) of the chain-terminated polymeric composition as an additive for a polymeric composition, such as polyvinyl chloride (PVC), and to the use (application) of the chain-terminated polymeric composition as a plasticizer. A thermoplastic resin composition and a compound for a closure are suggested as well.

Polymers can be used in a wide variety of applications. Often softness and flexibility are important properties of these compositions. In order to achieve this, plasticizers are commonly used, cf. U.S. Pat. No. 4,122,057 (Emery).

Aromatic and aliphatic ester- and polyester-based compositions are well known as plasticizers. These compositions are applied in various applications such as cable and wire, floor and wall coverings. Moreover, plasticizers are widely used in medical devices and food packaging applications. For example, they are used in cling film as well as in sealing gaskets for lids in the food industry.

General purpose ortho-phthalate esters, such as Di(2-ethylhexyl)phthalate (DEHP), Diisononyl phthalate (DINP) and Diisodecylphthalate (DIDP), being derived from crude fuel, are the worldwide most commonly used PVC plasticizers. However, ortho-phthalate esters are under scrutiny as they are suspected to have adverse effects on human health. In Europe, these phthalates are subject to restrictions by legislation. Especially in food packing applications, end-users are increasingly hesitating to accept the use of phthalates. Therefore, it is essential to identify environmentally friendly, highly compatible, well-performing and safe alternative plasticizers.

In terms of long-term sustainability the development of new plasticizers may consider renewable resources and bio-degradabilty in order to ensure safe end-of-life disposal and a reduced carbon footprint.

The use of bio-based edible monomeric plasticizers, such as glycerol esters, in particular acetylated monoglycerides of fatty acids, in thermoplastic resin compositions has been disclosed in U.S. Pat. No. 4,426,477 (Riken). Notwithstanding, especially lipophilic monomeric plasticizers in gaskets which are in contact with fatty or oily foodstuff may come in conflict with stringent migration restrictions in areas such as Europe, mainly due to their low molecular weight and high compatibility with fatty or oily foodstuff.

Other known polymeric plasticizers exhibit significant improvements compared to monomeric plasticizers in terms of their migration resistance. Certain polymeric plasticizers are authorized for food contact applications according to EU Regulation 10/2011, however, a specific migration restriction applies which may void the aforementioned advantages of polymeric plasticizers.

Plasticized polymeric resin, such as PVC, plays a predominant role in the field of metal vacuum closures, such as Twist-Off and Press-On-Twist-Off closures. The sealing performance of these closures is mainly dependent on the physical properties of the sealing gasket, which are strongly determined by the chemical composition of the plasticizers used therein. Essential selection criteria regarding the suitability of plasticizers in food contact applications are properties such as low plasticizer volatility, low plastisol viscosity, PVC compatibility, softness and resilience of the gasket as well as non-toxicity and high plasticizer migration resistance.

The aforementioned criteria are needs or objectives of the invention. To solve the identified objectives, the invention provides a novel chain-terminated polymeric composition.

The novel chain-terminated polymeric composition is obtained by condensation reaction of appropriate ratios of dibasic carboxylic acid with glycerol or polyglycerol to form the backbone of the composition and condensation reaction of the backbone with monobasic carboxylic acid as hydroxyl-terminating agent.

The reaction is described by the following chemical equation (1) for obtaining the novel chain-terminated polymeric composition. Non-limiting reaction mechanism for the production of the chain-terminated polymeric composition of this invention include the reaction of glycerol or polyglycerol with the appropriate anhydrides, esters or halogenides of dibasic and monobasic carboxylic acids. Also included is the reaction of partial monocarboxylic esters of glycerol or polyglycerol with the appropriate anhydrides, esters or halogenides of dibasic and monobasic carboxylic acids.

Chemical equation 1

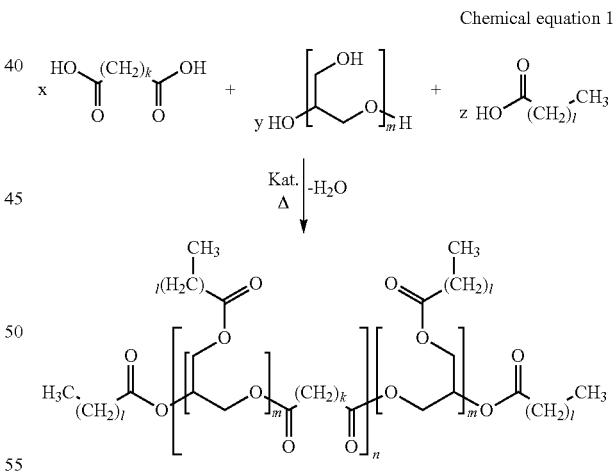

The process forming the chain-terminated polymeric composition is carried out by methods known as the prior art and includes the application of elevated reaction temperatures ranging from about 100 to 220° C. as well as the non-limiting use of respective catalysts, such as p-toluenesulphonic acid, tin(II)oxalate or tetrabutyl titanate.

Wherein x, y, and z are the stoichiometric ratios of dibasic carboxylic acid (DCA), glycerol or polyglycerol (GPG), and monobasic carboxylic acid (MCA), k is the number of methylene groups in the dibasic carboxylic acid, (k+2) is the number of carbon atoms therein, m is the degree of polymerization of polyglycerol used, (m+2) describes the hydroxyl functionality thereof, l is the number of methylene groups in the monobasic carboxylic acid, (l+2) is the number of carbon atoms in the monobasic carboxylic acid, and n is the degree of polymerization of the polyester formed by glycerol or polyglycerol and the dibasic carboxylic acid.

When using mixtures of different monobasic carboxylic acids as terminating agents, l is the average value of the number of methylene groups and (l+2) is the average value of the number of carbon atoms in the monobasic carboxylic acids in. In this case, l is determined by $$l=(z1*l1+z2*l2+\ldots+zi*li)/z,$$

wherein z1 is the stoichiometric coefficient of the first monobasic carboxylic acid, l1 is the number of methylene groups of the first monobasic carboxylic acid, z2 is the stoichiometric coefficient of the second monobasic carboxylic acid, l2 is the number of methylene groups of the second monobasic carboxylic acid, and z is the sum of the stoichiometric coefficients $(z1+z2+\ldots+zi)$.

In the above equation for the determination of l (little L) up to 2 or i>2 different monobasic carboxylic acids can be used.

The structure shown in chemical equation 1 is simplified for l being an integer. A non-integer average value of l cannot be displayed in the chemical equation, but a rational number may be created, when using combinations of monobasic carboxylic acids of different chain lengths and thus different integer l values. In such case l1, l2 and others participate according to their proportions z1, z2 and others in the chemical equation.

The chain-terminated polymeric composition obtained according to chemical equation 1 is characterized by a polyester backbone, comprising glycerol or polyglycerol and $C_4$ to $C_{12}$ dibasic carboxylic acid units linked by ester bonds. At remaining free hydroxyl groups of the backbone the terminating agent (i.e. $C_2$ to $C_{22}$ monobasic carboxylic acid) is linked by way of ester bonds.

The dibasic carboxylic acid contains from 4 to 12 (k from 2 to 10) carbon atoms, preferably 4 to 10 (k from 2 to 8) carbon atoms, more preferably an even number of carbon atoms between and including 4 and 10. Best results are obtained if adipic acid, sebacic acid, and mixtures thereof are used.

Glycerol (m is equal to 1) can be used as polyol. Polyglycerol with an average degree of polymerization from 1 to 4 is suitable, too. Excellent properties of the polymeric composition are obtained, if the average degree of polymerization of polyglycerol is from 1 to 3 or from 2 to 3.

Remaining free hydroxyl groups of the backbone are terminated by the terminating agent, comprising $C_2$ to $C_{22}$ monobasic carboxylic acid, preferably monobasic carboxylic acids having an even number of carbon atoms, more preferably comprising $C_2$ to $C_{14}$ monobasic carboxylic acid. In addition, free hydroxyl groups can be terminated by a terminating agent, comprising same $C_2$ to $C_8$ monobasic carboxylic acid or at least two different $C_2$ to $C_{22}$ monobasic carboxylic acids. Great results are obtained by using at least one $C_6$ to $C_{14}$ monobasic carboxylic acid and $C_2$ monobasic carboxylic acid. Furthermore, the terminating agent can comprise at least two different $C_2$ to $C_{12}$ monobasic carboxylic acids or preferably at least one $C_8$ to $C_{12}$ and $C_2$ monobasic carboxylic acid. Especially useful terminating agents comprise acetic acid, caproic acid, caprylic acid, capric acid, lauric acid, and myristic acid, and combinations thereof. $C_6$ to $C_{12}$ monobasic carboxylic acid, more preferably monobasic carboxylic acid having an even number of carbon atoms between and including $C_6$ and $C_{12}$ can also be used as terminating agent.

One important characteristic property of the chain-terminated polymeric composition is a hydrophilic-lipophilic-balance (HLB) value from 4.5 up to and including 7.5. The HLB value is preferably from 5 up to and including 7. Best results are received for HLB values between and including 5 and 6.5. The HLB values are determined according to Griffin using the following formula . . . .

$$HLB=20*M_O/M$$

wherein $M_O$ is the molar mass of the sum of oxygen atoms in the target composition and M is the total molar mass of the target composition.

The target composition according to chemical equation 1 is defined by the stoichiometric ratio x:y:z of the dibasic carboxylic acid, glycerol or polyglycerol, and the monobasic carboxylic acid. Preferably, the polyesters obtained according to the present invention contain virtually no free carboxyl groups or hydroxyl groups, thus have low hydroxyl and acid numbers. Therefore, x, y, and z are chosen such that the sum of carboxylic groups and sum of hydroxyl groups are equal, i.e.

$$y*(m+2)=2*x+z$$

wherein $y*(m+2)$ is the sum of hydroxyl groups of the glycerol or polyglycerol moiety and $2*x+z$ is the sum of carboxylic groups of the dibasic carboxylic acid and the monobasic carboxylic acid moiety.

According to chemical equation 1, the polyester backbone is formed under the conditions x=n and y=n+1. These preconditions given, the number of the carboxylic groups in the monobasic carboxylic acid is $$z=(n+1)(m+2)-2n$$

Consequently, the stoichiometric ratio x:y:z of the dibasic carboxylic acid, glycerol or polyglycerol, and the monobasic carboxylic acid is $$x:y:z=n:(n+1):((n+1)(m+2)-2n)$$

wherein
n is a positive number up to and including 5, preferably an integer 1 to 5
m is a rational number between and including 1 and 4.

If two or more different monobasic carboxylic acids (MCA1, MCA2, . . . MCAi) are used, z is the sum of the respective stoichiometric coefficients (z1, z2, . . . zi).

It is possible to carry out the polyesterification of the starting materials in a one-step process or in a two-step process. In a one-step process the starting materials dibasic acid, glycerol or polyglycerol and monobasic carboxylic acid are intermixed and allowed to react simultaneously. In two-step process the monobasic carboxylic acid moiety is esterified with glycerol or polyglycerol forming a partial ester having free hydroxyl groups which at a later stage of the reaction are converted with the dibasic carboxylic acid into a polyester. Alternatively, the dibasic carboxylic acid moiety is esterified with glycerol or polyglycerol forming the polyester backbone first, and in a second step, free hydroxyl groups of the backbone are converted with the monobasic carboxylic acid into a polyester. The latter type of polyesterification is particularly preferred, if volatile monobasic carboxylic acids, such as acetic acid, propionic acid or butyric acid, are difficult to be incorporated into the target polyester. In such cases, it is advisable to make use of the respective anhydride or halogenide of the monobasic carboxylic acid which, due to its high reactivity, can be easily employed at significantly lower reaction temperature.

The chain-terminated polymeric compositions (of the claimed invention) are novel and provide unique properties. This is a consequence of the particular combination of reactants and proportions at which they are employed.

Key properties to be achieved are low plasticizer and plastisol viscosities, good PVC compatibility and high migration resistance of the plasticizer into lipophilic media such as fatty and oily foodstuff. At the same time, reactants should be selected in a way that no adverse risks to humans are to be expected.

Plasticizer and plastisol viscosity is a consequence of the molecular weight of the chain-terminated polymeric composition. This property is mainly determined by the degree of polymerization n of the backbone of the chain-terminated polymeric composition as well as the degree of polymerization m of the glycerol or polyglycerol component GPG, the chain length (k+2) of the dibasic carboxylic acid DCA and the chain length (l+2) of the chain-terminating monobasic carboxylic acid MCA.

PVC compatibility is reflected by the softness and the tensile properties of a thermoplastic resin composition prepared from a thermoplastic PVC resin and the chain-terminated polymeric composition. This property is mainly dependent on the polarity (HLB value) of the chain-terminated polymeric composition and is adjustable by selection of the monobasic carboxylic acid.

Plasticizer migration resistance is a consequence of the molecular weight and the polarity (HLB value) of the chain-terminated polymeric composition. This property is mainly determined by the degree of polymerization n of the chain-terminated polymeric composition itself as well as the degree of polymerization m of the glycerol or polyglycerol component GPG, the chain length (k+2) of the dibasic carboxylic acid DCA and the chain length (l+2) of the chain-terminating monobasic carboxylic acid MCA.

An advantageous balance between (at least) conflicting properties, plastisol viscosity, PVC compatibility (Shore A, Tensile) and migration resistance can be tailored by proper selection of parameters m, n, k, and l in order to achieve the optimum overall performance for the desired application.

Depending on the extend of making use of renewable raw material sources, the bio-based content of the chain-terminated polymeric composition can reach up to 100%.

High variability in the selection of the reactants DCA, GPG and MCA allows tuning the material properties and material performance. The reactants DCA, GPG and MCA used for the preparation of the chain-terminated polymeric composition can be selected in a way that they are known to be present in authorized food additives or in foodstuff already. Thus, when using the resulting chain-terminated polymeric composition as additive in food packaging, no adverse risks to human health are to be expected.

Safety and Sustainability are additional effects, achieved by the claimed composition.

The chain-terminated polymeric composition has average molecular weights, depending on the degrees of polymerization m and n, and on the number of carbon atoms in the monobasic and dibasic carboxylic acid k and l, from about 500 amu to 10000 amu, best properties are obtained if the average molecular weight is from about 750 amu to 1500 amu. Naturally the molecular weights are average molecular weights and can vary considerably within the distribution of the obtained compounds.

The claimed composition has 20° C. viscosities of about 200 m Pa s to 2500 m Pa s.

In the event that any of the compounds (dibasic carboxylic acid, glycerol or polyglycerol, or monobasic carboxylic acid) is purely used for the start of the synthesis of the polymeric composition, the respective variable k, m, or l is an integer.

If mixtures of the compounds (dibasic carboxylic acids, glycerol or polyglycerols, or monobasic carboxylic acids) are used for the start of the synthesis of the polymeric composition, the respective variable k, m, or l is a rational number, wherein k and l represent the average number of methylene groups in the mixture and m represents the average degree of polymerization of the polyglycerol used.

A method for preparation of the chain-terminated polymeric composition comprises several steps.

One step is mixing glycerol or polyglycerol and dibasic carboxylic acid having 4 to 12 carbon atoms as two monomers, and a terminating agent comprising monobasic carboxylic acid having 2 to 22 carbon atoms, to terminate free hydroxyl groups. This provides the targeted chain-terminated polymeric composition as a polyester.

The target polymeric composition has a hydrophilic-lipophilic-balance value (HLB) from 4.5 to 7.5, being determined according to the method of Griffin following the convention $HLB=20*(M_O/M)$.

$M_O$ therein is the molar mass of the sum of oxygen atoms in the target composition and M is the total molar mass of the target composition.

The chain-terminated polymeric composition is readily processable with polymeric resins, wherein the invention has in a further invention less than 50 wt. % and acts as plasticizer. Another plasticizer can be added to the composition, which comprises a polymeric resin and the novel polymeric composition as first plasticizer, wherein the first plasticizer has more than 30 wt. % of the total amount of the first and second plasticizer. Further, a heat stabilizer may be added to the compositions with one or two plasticizers.

The invention is preferably processable with polymeric resins, such as PVC.

The chain-terminated polymeric composition can be used as a plasticizer. A polymeric resin used with the chain-terminated polymeric composition may be PVC, improving the physical properties of the polymeric resin and at the same time showing superior migration properties to lipophilic phases, such as fatty foods.

Due to this and the food-like nature of the composition's components the chain-terminated polymeric composition is predestined for the use in polymeric PVC sealing gaskets for food packaging industry applications, especially for fatty foods.

The sealing gaskets show superior properties if the chain-terminated polymeric composition (the plasticizer) has 30 to 45 wt. %.

The sealing gaskets also show superior properties if the sealing gaskets have 45 to 65 wt. % PVC of the total mass of the compound. Any combination of these two ranges are disclosed as long as they do not exceed 100 wt. %. To eventually complete 100 wt. %, stabilizers, pigments and further additives up to no more than 10 wt. % are added, as common in this field.

Still acceptable results are obtained in a broader range specification if the sealing gasket compounds have less than 40 wt. % of the chain-terminated polymeric composition or at least 60 wt. % PVC.

Any combinations of these two broader ranges are disclosed as well.

The acid value of the claimed chain-terminated polymeric compositions is preferably less than 100, more preferably less than 50 and even more preferably less than 10.

The hydroxyl value of the claimed chain-terminated polymeric compositions is preferably less than 100, more preferably less than 50 and even more preferably less than 10.

Examples explain and detail the invention as claimed.

TABLE 1

Starting substances (monomers) stoichiometric ratios and quantities used for the preparation of chain-terminated polymeric compositions obtained by general preparation procedures A to F, explained later.

|  |  |  | Backbone | | Terminator | | Stoichiometric Ratio | | | | | DCA |
| --- | --- | --- | --- | --- | --- | --- | --- | --- | --- | --- | --- | --- |
| Example | Procedure | Code | DCA (k + 2) | GPG m | MCA1 (l + 2] | MCA2 (l + 2] | DCA x | GPG y | MCA z | MCA1 z1 | MCA2 z2 | [mol] w |
| I | A | 418 | 4 | 1 | 8 |  | 1 | 2 | 4 | 4 |  | 0.2 |
| II | B | 418/2_50 | 4 | 1 | 8 | 2 | 1 | 2 | 4 | 2 | 2 | 0.2 |
| III | A | 618 | 6 | 1 | 8 |  | 1 | 2 | 4 | 4 |  | 0.2 |
| IIIb | C | 618 | 6 | 1 | 8 |  | 1 | 2 | 4 | 4 |  | 0.2 |
| IIIc | E | 618 | 6 | 1 | 8 |  | 1 | 2 | 4 | 4 |  | 0.2 |
| IV | B | 6112/2_50 | 6 | 1 | 12 | 2 | 1 | 2 | 4 | 2 | 2 | 0.2 |
| V | A | 618 | 6 | 1 | 8 |  | 3 | 4 | 6 | 6 |  | 0.1 |
| VI | B | 618/2_50 | 6 | 1 | 8 | 2 | 1 | 2 | 4 | 2 | 2 | 0.15 |
| VIb | D | 618/2_50 | 6 | 1 | 8 | 2 | 1 | 2 | 4 | 2 | 2 | 0.15 |
| VIc | F | 618/2_50 | 6 | 1 | 8 | 2 | 1 | 2 | 4 | 2 | 2 | 0.15 |
| VII | B | 618/2_50 | 6 | 1 | 8 | 2 | 2 | 3 | 5 | 2.5 | 2.5 | 0.15 |
| VIII | A | 918 | 9 | 1 | 8 |  | 1 | 2 | 4 | 4 |  | 0.15 |
| IX | A | 1018 | 10 | 1 | 8 |  | 1 | 2 | 4 | 4 |  | 0.15 |
| X | A | 1018 | 10 | 1 | 8 |  | 3 | 4 | 6 | 6 |  | 0.1 |
| XI | B | 1018/2_50 | 10 | 1 | 8 | 2 | 1 | 2 | 4 | 2 | 2 | 0.2 |
| XII | D | 1012 | 10 | 1 | 0 | 2 | 1 | 2 | 4 | 0 | 4 | 0.25 |
| XIII | D | 1212 | 12 | 1 | 0 | 2 | 1 | 2 | 4 | 0 | 4 | 0.25 |
| XIV | A | 628 | 6 | 2 | 8 |  | 1 | 2 | 6 | 6 |  | 0.1 |
| XV | B | 6212/2_33 | 6 | 2 | 12 | 2 | 1 | 2 | 6 | 2 | 4 | 0.1 |
| XVI | B | 10212/2_33 | 10 | 2 | 12 | 2 | 1 | 2 | 6 | 2 | 4 | 0.1 |
| XVII | B | 438/2_50 | 4 | 3 | 8 | 2 | 1 | 2 | 8 | 4 | 4 | 0.15 |
| XVIII | B | 638/2_50 | 6 | 3 | 8 | 2 | 1 | 2 | 8 | 4 | 4 | 0.1 |
| XVIIIb | D | 638/2_50 | 6 | 3 | 8 | 2 | 1 | 2 | 8 | 4 | 4 | 0.1 |
| XVIIIc | F | 638/2_50 | 6 | 3 | 8 | 2 | 1 | 2 | 8 | 4 | 4 | 0.1 |
| XIX | B | 6312/2_40 | 6 | 3 | 12 | 2 | 1 | 2 | 8 | 3.2 | 4.8 | 0.1 |
| XX | B | 10312/2_33 | 10 | 3 | 12 | 2 | 1 | 2 | 8 | 2.7 | 5.3 | 0.1 |

Code defines the respective example
DCA dibasic carboxylic acid
k + 2 number of carbon atoms of DCA
GPG glycerol or polyglycerol
m degree of polymerization of polyglycerol
MCA monobasic carboxylic acid
(l + 2) number of carbon atoms of MCA
z = z1 + z2

TABLE 2

Properties of chain-terminated polymeric compositions of table 1.

| Example | Code | n | Saponification value | Acid value | Hydroxyl value | Viscosity | HLB |
| --- | --- | --- | --- | --- | --- | --- | --- |
| I | 418 | 1 | 435.1 | 28.2 | 28.5 | 193 | 5.0 |
| II | 418/2_50 | 1 | 559.8 | 9.6 | 10.0 | 514 | 6.4 |
| III | 618 | 1 | 417.4 | 17.8 | 31.9 | 214 | 4.8 |
| IIIb | 618 | 1 | 426.7 | 3.1 | 27.5 | 251 | 4.8 |
| IIIc | 618 | 1 | 417.0 | 3.7 | 22.6 | 194 | 4.8 |
| IV | 6112/2_50 | 1 | 459.4 | 8.45 | 14.3 | 435 | 5.2 |
| V | 618 | 3 | 462.2 | 19.8 | 29.0 | 1400 | 5.3 |
| VI | 618/2_50 | 1 | 520.9 | 13.6 | 52.9 | 658 | 6.1 |
| VIb | 618/2_50 | 1 | 533.7 | 1.6 | 0.0 | 291 | 6.1 |
| VIc | 618/2_50 | 1 | 529.7 | 1.7 | 0.0 | 292 | 6.1 |
| VII | 618/2_50 | 2 | 547.6 | 28.2 | 10.3 | 1560 | 6.3 |
| VIII | 918 | 1 | 391.7 | 16.7 | 28.3 | 277 | 4.6 |
| IX | 1018 | 1 | 387.4 | 16.5 | 30.9 | 253 | 4.5 |
| X | 1018 | 3 | 414.1 | 17.5 | 27.5 | 1872 | 4.7 |
| XI | 1018/2_50 | 1 | 487.1 | 6.8 | 8.0 | 438 | 5.6 |
| XII | 1012 | 1 | 640.9 | 7.2 | 0.2 | 800 | 7.4 |
| XIII | 1212 | 1 | 610.5 | 14.4 | 1 | 1000 | 7.0 |
| XIV | 628 | 1 | 365.8 | 19.4 | 28.6 | 419 | 4.8 |
| XV | 6212/2_33 | 1 | 478.1 | 41.4 | 1 | 420 | 5.9 |
| XVI | 10212/2_33 | 1 | 446.6 | 38.1 | 1 | 660 | 5.6 |

TABLE 2-continued

Properties of chain-terminated polymeric compositions of table 1.

| Example | Code | n | Saponification value | Acid value | Hydroxyl value | Viscosity | HLB |
|---|---|---|---|---|---|---|---|
| XVII | 438/2_50 | 1 | 457.7 | 55.1 | 20.7 | 830 | 6.2 |
| XVIII | 638/2_50 | 1 | 453.1 | 21.3 | 1 | 930 | 6.1 |
| XVIIIb | 638/2_50 | 1 | 444.9 | 7.2 | 1 | 500 | 6.1 |
| XVIIIc | 638/2_50 | 1 | 465.2 | 1.5 | 0.0 | 1187 | 6.1 |
| XIX | 6312/2_40 | 1 | 433.9 | 37.6 | 1.1 | 510 | 5.6 |
| XX | 10312/2_33 | 1 | 390.0 | 24.7 | 36.0 | 2230 | 5.6 |

Code defines the respective example (as in table 1)
n integer from 1 to 5
Viscosity resistance of the polymeric composition in response shear stress at 20° C., expressed in m Pa s, measured in accordance with DIN 53019
Saponification value represents the mass (in mg) of potassium hydroxide (KOH) required to saponify 1 g of an ester, measured in accordance with DIN 53401
Acid value mass of potassium hydroxide (KOH) in mg that is required to neutralize 1 g of chemical substance. It is a measure of the amount of free carboxylic acid groups in a chemical compound or in a mixture of compounds, measured in accordance with DIN EN ISO 2114
Hydroxyl value measure of the content of free hydroxyl-groups in a compound, typically a natural or synthetic ester. This value is a useful measure of the degree of esterification in ester synthesis, measured in accordance with DIN 53240

The HLB value is determined according to the method of Griffin HLB=20*($M_O$/M), wherein $M_O$ is the molar mass of the sum of oxygen atoms in the target composition and M is the total molar mass of the target composition.

The acid value and hydroxyl value of the chain-terminated polymeric compositions is smaller than 100.

Table 3 (Next Page):

Properties of thermoplastic resin compositions prepared with chain-terminated polymeric compositions of above examples I to XIX (not for columns "Plastisol Viscosity" and "HLB").

Properties of comparative thermoplastic resin compositions prepared with commercially available monomeric compositions (glycerol esters of monobasic carboxylic acids) REF_A to REF_D, representing REF_A Unimoll AGF RT (acetylated monoglyceride of fatty acids, Lanxess)

REF_B Acetem 95 CO (acetylated monoglyceride of fatty acids, Danisco)

REF_C Softenol 3107 (Glyceroltriheptanoate, Unichema)

REF_D Edenol 1215 (conventional polymeric plasticizer from Emery).

The property "Plastisol Viscosity" of fluid thermoplastic resin compositions (plastisol) prepared with chain-terminated polymeric compositions of above examples I to XIX are shown in column "Plastisol Viscosity" only. This column "Plastisol Viscosity" does not give properties of the thermoplastic resin compositions.

The property "HLB" of chain-terminated polymeric compositions of above examples I to XIX used for the examples of this table are shown in the column "HLB" only and serve as a reference to table 1.

| Example | Code | n | Shore A | Tensile Strength | Elongation | Migration | Plastisol Viscosity | HLB |
|---|---|---|---|---|---|---|---|---|
| REF_A | 0112/2_33 | 0 | 79 | 13.9 | 323 | 20.0 | 440 | 5.4 |
| REF_B | 01818/2_33 | 0 | 79 | 13.4 | 327 | 20.0 | 510 | 5.4 |
| REF_C | 017 | 0 | 77 | 11.1 | 298 | 19.5 | 400 | 4.5 |
| REF_D | 1215 | | 83 | 14.7 | 270 | 0.8 | 12120 | 5.4 |
| I | 418 | 1 | 92 | 11.4 | 329 | 11.8 | 1660 | 5.0 |
| II | 418/2_50 | 1 | 85 | 17.2 | 272 | 0.7 | 7000 | 6.4 |
| III | 618 | 1 | 88 | 12.6 | 517 | 9.0 | 2040 | 4.8 |
| IIIb | 618 | 1 | 86 | 13.9 | 513 | 6.5 | 2360 | 4.8 |
| IIIc | 618 | 1 | 85 | 15.1 | 507 | 7.1 | 1760 | 4.8 |
| IV | 6112/2_50 | 1 | 89 | 13.0 | 229 | 8.0 | 3900 | 5.2 |
| V | 618 | 3 | 89 | 6.5 | 106 | 3.2 | 13600 | 5.3 |
| VI | 618/2_50 | 1 | 87 | 16.3 | 288 | 1.4 | 8870 | 6.1 |
| VIb | 618/2_50 | 1 | 82 | 16.0 | 324 | 1.5 | 3200 | 6.1 |
| VIc | 618/2_50 | 1 | 81 | 15.9 | 309 | 1.2 | 3000 | 6.1 |
| VII | 618/2_50 | 2 | 82 | 9.9 | 162 | 0.8 | 16700 | 6.3 |
| VIII | 918 | 1 | 87 | 13.6 | 276 | 8.2 | 4920 | 4.6 |
| IX | 1018 | 1 | 87 | 12.5 | 468 | 9.4 | 4680 | 4.5 |
| X | 1018 | 3 | 87 | 7.9 | 277 | 4.7 | 29700 | 4.7 |
| XI | 1018/2_50 | 1 | 81 | 14.7 | 241 | 1.2 | 6300 | 5.6 |
| XII | 1012 | 1 | 83 | 12.7 | 217 | 0.2 | 9600 | 7.4 |
| XIII | 1212 | 1 | 82 | 13.9 | 257 | 0.2 | 7470 | 7.0 |
| XIV | 628 | 1 | 94 | 7.9 | 108 | 12.5 | 4900 | 4.8 |
| XV | 6212/2_33 | 1 | 91 | 12.9 | 199 | 1.3 | 6700 | 5.9 |
| XVI | 10212/2_33 | 1 | 86 | 16.2 | 293 | 1.6 | 13000 | 5.6 |
| XVII | 438/2_50 | 1 | 96 | 10.9 | 169 | 0.6 | 4680 | 6.2 |
| XVIII | 638/2_50 | 1 | 90 | 15.5 | 277 | 1.4 | 7200 | 6.1 |
| XVIIIb | 638/2_50 | 1 | 87 | 13.2 | 253 | 1.7 | 8600 | 6.1 |

-continued

| Example | Code | n | Shore A | Tensile Strength | Elongation | Migration | Plastisol Viscosity | HLB |
|---|---|---|---|---|---|---|---|---|
| XVIIIc | 638/2_50 | 1 | 87 | 14.3 | 252 | 1.5 | 7400 | 6.1 |
| XIX | 6312/2_40 | 1 | 96 | 10.6 | 159 | 4.1 | 7200 | 5.6 |
| XX | 10312/2_33 | 1 | 96 | 10.0 | 137 | 2.8 | 11800 | 5.6 |

Shore A Shore A hardness is the relative hardness of the thermoplastic resin composition, determined with a Shore A durometer, measured in accordance with DIN EN ISO 868
Tensile Strength force required to pull the thermoplastic resin composition to a point where it breaks, expressed as N/mm², measured in accordance with DIN 53455
Elongation strain on the thermoplastic resin composition when it breaks, expressed as percent, measured in accordance with DIN 53455
Migration simulation of overall migration where the thermoplastic resin composition is brought in contact with isooctane at a temperature of 20° C. for 2 days, expressed as mg/cm²
Plastisol Viscosity measure of the resistance of the fluid thermoplastic resin composition (plastisol) to shear stress at 40° C., expressed as m Pa s, measured in accordance with DIN53019, but not being valid for the thermoplastic resin composition The HLB value is determined according to the method of Griffin HLB=20*($M_O$/M), wherein $M_O$ is the molar mass of the sum of oxygen atoms in the target composition and M is the total molar mass of the target composition.

PREPARATION PROCEDURE A

Preparation of Examples I, III, V, VIII, IX, X, and XIV w*x mol DCA-(k+2), w*y mol GPG-(m), w*z1 mol MCA-(l+2), and 0.25 g of p-toluenesulfonic acid monohydrate are added into a 250 mL round-bottom flask. The flask is designed to be heated and strong enough to be evacuated. A standard glass flask is sufficient for this task.

The flask is equipped with a thermometer and a magnetic stir bar, driven from below.

The mixture is continuously stirred upon adding the components using the magnetic stir bar.

A vacuum of 500 mbar (50 kPa) is applied to the flask and the mixture is heated by a heater (heating device) to a temperature of 100° C.

Depending on the reaction progress, the temperature is increased up to 120° C. and the pressure is continuously reduced to 50 mbar (5 kPa) in order to remove water forming during the reaction process.

A distilling step is provided until no further water evaporation is observed (typically during 2 to 4 hours).

The chain-terminated polymeric composition product is obtained as a yellow liquid in practically 100% yield.

This resulting crude product is characterized in its properties without purification.

PREPARATION PROCEDURE B

Preparation of Examples II, IV, VI, VII, XI, XV, XVI, XVII, XVIII, XIX, and XX w*x mol DCA-(k+2), w*y mol GPG-(m), w*z1 mol MCA-(l+2), and 0.25 g of p-toluenesulfonic acid monohydrate are added into a 250 mL round-bottom flask. The flask is designed to be heated, and strong enough to be evacuated. A standard glass flask is sufficient for this task.

The flask is equipped with a thermometer and a magnetic stir bar, driven from below. The mixture is continuously stirred upon adding the components using the magnetic stir bar.

A vacuum of 500 mbar (50 kPa) is applied to the flask and the mixture is heated by a heater (heating device) to a temperature of 100° C.

Depending on the reaction progress, the temperature is increased up to 120° C. and the pressure is continuously reduced to 50 mbar (5 kPa) in order to remove water forming during the reaction process.

A distilling step is provided until no further water evaporation is observed (typically during 2 to 4 hours).

The heater is switched off and the mixture is allowed to cool down to a temperature of 100° C.

The vacuum is released after this or the prior step. The mixture remains in the flask. A dropping funnel is attached to it.

Through the dropping funnel 1.1*z2 mol acetic acid anhydride is slowly added to the cooled down mixture in a way that the reaction temperature stays between 100° C. and 120° C. After the adding is completed, the temperature is kept between 100° C. and 120° C. for further 2 hours by the heater.

In order to remove excess acetic acid anhydride and acetic acid from the mixture, a vacuum of 500 mbar (50 kPa) is again applied to the flask with the mixture. The pressure is continuously reduced down to 50 mbar (5 kPa) until no further acetic acid evaporation is observed.

The chain-terminated polymeric composition product is obtained as a yellow liquid in practically 100% yield.

This resulting crude product is characterized in its properties without purification.

PREPARATION PROCEDURE C

Preparation of Examples IIIb w*x mol DCA-(k+2), w*y mol GPG-(m), w*z1 mol MCA-(l+2), and 0.2 g of stannous oxalate (tin (2+)oxalate) are added into a 250 mL round-bottom flask. The flask is designed to be heated, and strong enough to be evacuated. A standard glass flask is sufficient for this task.

The flask is equipped with a thermometer and a magnetic stir bar, driven from below.

The mixture is continuously stirred upon adding the components using the magnetic stir bar.

A vacuum of 500 mbar (50 kPa) is applied to the flask and the mixture is heated to a temperature of 160° C. under continuous stirring. The mixture is distilled for 6 h.

Depending on the reaction progress, the temperature is increased up to 180° C. and the pressure is continuously reduced to 50 mbar (5 kPa) in order to remove water forming during the reaction process.

A distilling step is provided until no further water evaporation is observed (typically during 4 to 6 hours).

The chain-terminated polymeric composition product is obtained as a yellow liquid in practically 100% yield.

This resulting crude product is characterized in its properties without purification.

PREPARATION PROCEDURE D

Preparation of Examples VIb, XII, XIII, and XVIIIb $w*x$ mol DCA-$(k+2)$, $w*y$ mol GPG-$(m)$, $w*z1$ mol MCA-$(l+2)$, and 0.2 g of stannous oxalate (tin (2+)oxalate) are added into a 250 mL round-bottom flask. The flask is designed to be heated, and strong enough to be evacuated. A standard glass flask is sufficient for this task.

The flask is equipped with a thermometer and a magnetic stir bar, driven from below. The mixture is continuously stirred upon adding the components using the magnetic stir bar.

A vacuum of 500 mbar (50 kPa) is applied to the flask and the mixture is heated by a heater (heating device) to a temperature of 160° C.

Depending on the reaction progress, the temperature is increased up to 180° C. and the pressure is continuously reduced to 50 mbar (5 kPa) in order to remove water forming during the reaction process.

A distilling step is provided until no further water evaporation is observed (typically during 4 to 6 hours).

The heater is switched off and the mixture is allowed to cool down to a temperature of 120° C.

The vacuum is released after this or the prior step. The mixture remains in the flask. A dropping funnel is attached to it.

Through the dropping funnel $1.1*z2$ mol acetic acid anhydride is slowly added to the cooled down mixture in a way that the reaction temperature stays at 120° C. After the adding is completed, the temperature is kept at 120° C. for further 4 hours by the heater.

In order to remove excess acetic acid anhydride and acetic acid from the mixture, a vacuum of 500 mbar (50 kPa) is again applied to the flask with the mixture. The pressure is continuously reduced down to 50 mbar (5 kPa) until no further acetic acid evaporation is observed.

The chain-terminated polymeric composition product is obtained as a yellow liquid in practically 100% yield.

This resulting crude product is characterized in its properties without purification.

PREPARATION PROCEDURE E

Preparation of Examples IIIc $w*x$ mol DCA-$(k+2)$, $w*y$ mol GPG-$(m)$, $w*z1$ mol MCA-$(l+2)$, and 0.1 g tetrabutyl titanate are added into a 250 mL round-bottom flask. The flask is designed to be heated, and strong enough to be evacuated. A standard glass flask is sufficient for this task.

The flask is equipped with a thermometer and a magnetic stir bar, driven from below.

The mixture is continuously stirred upon adding the components using the magnetic stir bar.

A vacuum of 500 mbar (50 kPa) is applied to the flask and the mixture is heated to a temperature of 160° C. under continuous stirring. The mixture is distilled for 6 h.

Depending on the reaction progress, the temperature is increased up to 180° C. and the pressure is continuously reduced to 50 mbar (5 kPa) in order to remove water forming during the reaction process.

A distilling step is provided until no further water evaporation is observed (typically during 4 to 6 hours).

The chain-terminated polymeric composition product is obtained as a yellow liquid in practically 100% yield.

This resulting crude product is characterized in its properties without purification.

PREPARATION PROCEDURE F

Preparation of Examples VIc, and XVIIc $w*x$ mol DCA-$(k+2)$, $w*y$ mol GPG-$(m)$, $w*z1$ mol MCA-$(l+2)$, and 0.1 g tetrabutyl titanate are added into a 250 mL round-bottom flask. The flask is designed to be heated, and strong enough to be evacuated. A standard glass flask is sufficient for this task.

The flask is equipped with a thermometer and a magnetic stir bar, driven from below. The mixture is continuously stirred upon adding the components using the magnetic stir bar.

A vacuum of 500 mbar (50 kPa) is applied to the flask and the mixture is heated by a heater (heating device) to a temperature of 160° C.

Depending on the reaction progress, the temperature is increased up to 180° C. and the pressure is continuously reduced to 50 mbar (5 kPa) in order to remove water forming during the reaction process.

A distilling step is provided until no further water evaporation is observed (typically during 4 to 6 hours).

The heater is switched off and the mixture is allowed to cool down to a temperature of 120° C.

The vacuum is released after this or the prior step. The mixture remains in the flask. A dropping funnel is attached to it.

Through the dropping funnel $1.1*z2$ mol acetic acid anhydride is slowly added to the cooled down mixture in a way that the reaction temperature stays at 120° C. After the adding is completed, the temperature is kept at 120° C. for further 4 hours by the heater.

In order to remove excess acetic acid anhydride and acetic acid from the mixture, a vacuum of 500 mbar (50 kPa) is again applied to the flask with the mixture. The pressure is continuously reduced down to 50 mbar (5 kPa) until no further acetic acid evaporation is observed.

The chain-terminated polymeric composition product is obtained as a yellow liquid in practically 100% yield.

This resulting crude product is characterized in its properties without purification.

Thermoplastic PVC resin compositions are composed of polymeric compositions (plasticizer as detailed before in table 1), additives and polyvinyl chloride (PVC) according to table 4 below.

TABLE 4

Ingredients used for the preparation of thermoplastic resin compositions.

| No. | Ingredient | Weight Percent |
|---|---|---|
| 1 | Chain-terminated polymeric composition (examples I-XIX) | 37.6 |
| 2 | Polydimethylsiloxane | 0.5 |
| 3 | Heat stabilizer | 2.0 |
| 4 | Titanium dioxide | 0.5 |
| 5 | Polyvinylchloride Resin A | 9.0 |
| 6 | Polyvinylchloride Resin B | 48.4 |

The thermoplastic resin compositions contain 37.6 wt. % chain-terminated polymeric composition (one of prior explained examples I-XIX of table 1), 0.5 wt. % polydimethylsiloxane (Wacker AK 350), 2.0 wt. % heat stabilizer (Lamberti CZ8), 0.5 wt. % titanium dioxide pigment (Kronos 1001), 48.4 wt. % PVC A (Vinnolit P70) and 9.0 wt. % PVC B (Vinnolit C65V).

The following procedure is used to prepare thermoplastic resin compositions:

Ingredients no. 1 to 4 are weighted and stirred in a container using a small-scale dispenser at substantially 500 rpm for 5 min. The rotation speed is raised to 1000 rpm and ingredients 5 and 6 are added using a spatula.

Stirring is continued for about 20 min. The rotation speed is lowered to 300 rpm and the mixture is de-aerated at 20 mbar for about 20 min. The PVC plastisol is obtained as a white pasty fluid.

After determination of the plastisol viscosity at 40° C., 30 g of the plastisol is poured on a tinplate of 0.15 mm thickness. A doctor blade is used to spread out the plastisol leaving a homogenous plastisol film of about 1 mm thickness on the tinplate surface.

The tinplate is transferred to an air-conditioned oven where the plastisol film is cured at 205° C. for 200 sec. The cured film on the tinplate is allowed to cool down to substantially room temperature. The thermoplastic resin composition (plasticized PVC) is obtained as a solid film of about 1 mm thickness.

The polymeric composition obtained by this process as plastisol or thermoplastic resin composition thus comprises a chain-terminated polymeric composition as described in table 1 and a polymeric resin, wherein the chain-terminated polymeric composition has less than 50 wt. %.

In these compositions, but not limited to these compositions, the invention acts as additive and plasticizer, respectively.

The chain-terminated polymeric composition is compatible with known general purpose plasticizers as well as bio-based plasticizers. Blends of these plasticizers and the chain-terminated polymeric composition could provide desirable synergies between the plasticizers.

A second plasticizer and/or a heat stabilizer may be added, wherein any of the chain-terminated polymeric compositions as described is the first plasticizer and has more than 30 wt. % of the total amount of first and second plasticizers.

Typical additional plasticizers that are useful include plasticizers of the groups of acetylated monoglycerides, adipates, citrates, sebacates, and epoxidized fatty acid esters.

Especially suitable but not limiting heat stabilizers include lead-free mixed metal heat stabilizers, organic heat stabilizers, epoxides, salts of monocarboxylic acids, phenolic antioxidants, organic phosphites, hydrotalcites, and zeolites.

A Compound may have PVC and the chain-terminated polymeric composition of table 1. This compound is suitable as sealing gasket for a closure. Preferably the plasticizer therein has less than 40 wt. % and/or polyvinyl chloride has at least 55 wt. % therein.

The sealing gasket can be applied to the closure by nozzle injection. Thereby, a fluid thermoplastic resin composition (plastisol) according to the procedure describing the preparation of thermoplastic resin compositions is applied to a channel on the inside surface (the sealing surface) of a lid by nozzle injection.

Thereafter, the lid with the annular fluid thermoplastic resin composition (plastisol) is passed through a curing oven, whereby solid thermoplastic resin composition (plasticized) is formed by curing and may act as sealing gasket in the (lid) closure when the closure is applied to a glass container.

This closure may be a metal vacuum closure, such as a twist-off closure or a press-on-twist-off closure (PT).

The invention claimed is:

1. A chain-terminated polymeric composition derived from two monomers by condensation reaction, one of the two monomers comprising glycerol or polyglycerol, the other one comprising a $C_4$ to $C_{12}$ dibasic carboxylic acid, thereby providing a polyester backbone having free hydroxyl groups;

the free hydroxyl groups being terminated by condensation reaction of the free hydroxyl groups with a terminating agent, said agent comprising at least one $C_2$ to $C_{22}$ monobasic carboxylic acid, providing the chain-terminated polymeric composition;

the chain-terminated polymeric composition having a hydrophilic-lipophilic-balance value from 4.5 to 7.5, being determined according to the method of Griffin following the convention $$HLB=20*(M_O/M);$$

wherein $M_O$ is the molar mass of the sum of oxygen atoms in the chain-terminated polymeric composition and M is the total molar mass of the chain-terminated polymeric composition, the chain-terminated polymeric composition having a hydroxyl value of less than 100, the hydroxyl value being determined according to DIN 53240.

2. The chain-terminated polymeric composition of claim 1, wherein said chain-terminated polymeric composition has a hydrophilic-lipophilic-balance value from 5 to 7.

3. The chain-terminated polymeric composition of claim 1, wherein polyglycerol has an average degree of polymerization from 1 to 4.

4. The chain-terminated polymeric composition of claim 1, wherein the other one of the two monomers, comprises a $C_4$ to $C_{10}$ dibasic carboxylic acid.

5. The chain-terminated polymeric composition of claim 1, wherein the other one of the two monomers is selected from the group consisting of adipic acid, sebacic acid, and combinations thereof.

6. The chain-terminated polymeric composition of claim 1, wherein the free hydroxyl groups are terminated by at least two different $C_2$ to $C_{22}$ monobasic carboxylic acids.

7. The chain-terminated polymeric composition of claim 1, wherein the terminating agent comprises a monobasic carboxylic acid selected from the group consisting of acetic acid, caproic acid, caprylic acid, capric acid, lauric acid, myristic acid, and combinations thereof.

8. The chain-terminated polymeric composition of claim 1, wherein the acid value is less than 100, the acid value being determined according to DIN EN ISO 2114.

9. The chain-terminated polymeric composition of claim 1, wherein the hydroxyl value is less than 50, the hydroxyl value being determined according to DIN 53240.

10. The chain-terminated polymeric composition of claim 7, wherein the terminating agent comprises at least one monobasic carboxylic acid type having two to fourteen carbon atoms.

11. The chain-terminated polymeric composition of claim 1, wherein the monobasic carboxylic acids having an even number of carbon atoms.

12. The chain-terminated polymeric composition of claim 1, wherein said chain-terminated polymeric composition has a hydrophilic-lipophilic-balance value from 5.6 to 6.5.

13. A method for preparing a chain-terminated polymeric composition the method comprising the following steps:

mixing glycerol or polyglycerol and dibasic carboxylic acid having 4 to 12 carbon atoms as two monomers, and a terminating agent comprising monobasic carboxylic acid having 2 to 22 carbon atoms, to terminate free hydroxyl groups;

thereby providing the chain-terminated polymeric composition as a polyester;

the chain-terminated polymeric composition having a hydrophilic-lipophilic-balance value (HLB) from 4.5 to 7.5, being determined according to the method of Griffin following the convention $$HLB = 20 * (M_O/M);$$

wherein $M_O$ is the molar mass of the sum of oxygen atoms in the chain-terminated polymeric composition and M is the total molar mass of the chain-terminated polymeric composition, the chain-terminated polymeric composition having a hydroxyl value of less than 100, the hydroxyl value being determined according to DIN 53240.

* * * * *